United States Patent
Kim et al.

(10) Patent No.: US 7,339,746 B2
(45) Date of Patent: *Mar. 4, 2008

(54) SMALL AND FAST ZOOM SYSTEM USING MICROMIRROR ARRAY LENS

(75) Inventors: Hye Young Kim, Namwon-si (KR); Jin Young Sohn, Seoul (KR); Gyoung Il Cho, Seoul (KR); Sang Hyune Baek, Suwon (KR); Chenong Soo Seo, Seoul (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/429,034

(22) Filed: May 5, 2006

(65) Prior Publication Data

US 2006/0209423 A1 Sep. 21, 2006

Related U.S. Application Data (63) Continuation-in-part of application No. 10/806,299, filed on Mar. 22, 2004, now Pat. No. 7,057,826, and a continuation-in-part of application No. 10/855,715, filed on May 27, 2004, now Pat. No. 7,031,046, and a continuation-in-part of application No. 10/872,241, filed on Jun. 18, 2004, and a continuation-in-part of application No. 10/893,039, filed on Jul. 16, 2004, and a continuation-in-part of application No. 10/983,353, filed on Nov. 8, 2004, and a continuation-in-part of application No. 10/896,146, filed on Jul. 21, 2004, now Pat. No. 7,215,882, and a continuation-in-part of application No. 11/072,597, filed on Mar. 4, 2005, and a continuation-in-part of application No. 11/076,616, filed on Mar. 10, 2005, and a continuation-in-part of application No. 11/191,886, filed on Jul. 28, 2005, now Pat. No. 7,095,548, and a continuation-in-part of application No. 11/218,814, filed on Sep. 2, 2005, and a continuation-in-part of application No. 11/369,797, filed on Mar. 6, 2006.

(51) Int. Cl.
*G02B 15/00* (2006.01)

(52) U.S. Cl. .................... 359/683; 359/676

(58) Field of Classification Search ......... 359/676–706
See application file for complete search history.

(56) References Cited

U.S. PATENT DOCUMENTS 2,002,376 A 5/1935 Mannheimer (Continued)

OTHER PUBLICATIONS

Boyd et al, Fast-response Variable Focusing Micromirror Array Lens, Proceedings of SPIE, vol. 5055, pp. 278-286, 2003.*

*Primary Examiner*—Scott J. Sugarman
*Assistant Examiner*—Darryl J. Collins (57) ABSTRACT

The present invention provides a small and fast zoom system using micromirror array lens (MMAL). Thanks to the fast response and compactness of the MMAL as well as absence of the macroscopic mechanical movements of lenses, the zoom system of the present invention fastens the speed of the zooming and reduces the space and weight for the zoom system. Also the present invention provides magnifying the area not on the optical axis and can compensate the aberration of the zoom system.

31 Claims, 10 Drawing Sheets

U.S. PATENT DOCUMENTS

| | | | |
|---|---|---|---|
| 4,407,567 A * | 10/1983 | Michelet et al. | 359/676 |
| 4,834,512 A | 5/1989 | Austin | |
| 5,004,319 A | 4/1991 | Smither | |
| 5,212,555 A | 5/1993 | Stoltz | |
| 5,369,433 A | 11/1994 | Baldwin | |
| 5,402,407 A | 3/1995 | Eguchi | |
| 5,467,121 A | 11/1995 | Allcock | |
| 5,612,736 A | 3/1997 | Vogeley | |
| 5,696,619 A | 12/1997 | Knipe | |
| 5,881,034 A | 3/1999 | Mano | |
| 5,897,195 A | 4/1999 | Choate | |
| 5,986,811 A | 11/1999 | Wohlstadter | |
| 6,025,951 A | 2/2000 | Swart | |
| 6,028,689 A | 2/2000 | Michaliek | |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,282,213 B1 | 8/2001 | Gutin | |
| 6,315,423 B1 | 11/2001 | Yu | |
| 6,329,737 B1 | 12/2001 | Jerman | |
| 6,498,673 B1 | 12/2002 | Frigo | |
| 6,507,366 B1 | 1/2003 | Lee | |
| 6,549,730 B1 | 4/2003 | Hamada | |
| 6,625,342 B2 | 9/2003 | Staple | |
| 6,649,852 B2 | 11/2003 | Chason | |
| 6,650,461 B2 | 11/2003 | Atobe | |
| 6,658,208 B2 | 12/2003 | Watanabe | |
| 6,711,319 B2 | 3/2004 | Hoen | |
| 6,741,384 B1 | 5/2004 | Martin | |
| 6,784,771 B1 | 8/2004 | Fan | |
| 6,833,938 B2 | 12/2004 | Nishioka | |
| 6,885,819 B2 | 5/2005 | Shinohara | |
| 6,900,901 B2 | 5/2005 | Harada | |
| 6,900,922 B2 | 5/2005 | Aubuchon | |
| 6,906,848 B2 | 6/2005 | Aubuchon | |
| 6,906,849 B1 | 6/2005 | Mi | |
| 6,914,712 B2 | 7/2005 | Kurosawa | |
| 6,919,982 B2 | 7/2005 | Nimura | |
| 6,934,072 B1 | 8/2005 | Kim | |
| 6,934,073 B1 | 8/2005 | Kim | |
| 6,958,777 B1 | 10/2005 | Pine | |
| 6,970,284 B1 | 11/2005 | Kim | |
| 6,995,909 B1 | 2/2006 | Hayashi | |
| 6,999,226 B2 | 2/2006 | Kim | |
| 7,023,466 B2 | 4/2006 | Favalora | |
| 7,031,046 B2 | 4/2006 | Kim | |
| 7,046,447 B2 | 5/2006 | Raber | |
| 7,057,826 B2 * | 6/2006 | Cho et al. | 359/683 |
| 7,068,416 B2 | 6/2006 | Gim | |
| 7,077,523 B2 | 7/2006 | Seo | |
| 7,161,729 B2 | 1/2007 | Kim | |
| 2002/0018407 A1 | 2/2002 | Komoto | |
| 2002/0102102 A1 | 8/2002 | Watanabe | |
| 2002/0135673 A1 | 9/2002 | Favalora | |
| 2003/0058520 A1 | 3/2003 | Yu | |
| 2003/0071125 A1 | 4/2003 | Yoo | |
| 2003/0174234 A1 | 9/2003 | Kondo | |
| 2003/0184843 A1 | 10/2003 | Moon | |
| 2004/0009683 A1 | 1/2004 | Hiraoka | |
| 2004/0012460 A1 | 1/2004 | Cho | |
| 2004/0021802 A1 | 2/2004 | Yoshino | |
| 2004/0052180 A1 | 3/2004 | Hong | |
| 2004/0246362 A1 | 12/2004 | Konno | |
| 2004/0252958 A1 | 12/2004 | Abu-Ageel | |
| 2005/0024736 A1 | 2/2005 | Bakin | |
| 2005/0057812 A1 | 3/2005 | Raber | |
| 2005/0136663 A1 | 6/2005 | Terence Gan | |
| 2005/0174625 A1 | 8/2005 | Huiber | |
| 2005/0180019 A1 | 8/2005 | Cho | |
| 2005/0212856 A1 | 9/2005 | Temple | |
| 2005/0224695 A1 | 10/2005 | Mushika | |
| 2005/0225884 A1 | 10/2005 | Gim | |
| 2005/0231792 A1 | 10/2005 | Alain | |
| 2005/0264870 A1 | 12/2005 | Kim | |
| 2006/0012766 A1 | 1/2006 | Klosner | |
| 2006/0012852 A1 | 1/2006 | Cho | |
| 2006/0028709 A1 | 2/2006 | Cho | |
| 2006/0187524 A1 | 8/2006 | Sandstrom | |
| 2006/0209439 A1 | 9/2006 | Cho | |

* cited by examiner

SMALL AND FAST ZOOM SYSTEM USING MICROMIRROR ARRAY LENS

REFERENCE TO RELATED APPLICATIONS

This application is a continuation-in-part of, and claims priority to U.S. patent application Ser. No. 10/806,299 filed Mar. 22, 2004, now U.S. Pat. No. 7,057,826 U.S. patent application Ser. No. 10/855,715 filed May 27, 2004, now U.S. Pat. No. 7,031,046 U.S. patent application Ser. No. 10/872,241 filed Jun. 18, 2004, U.S. patent application Ser. No. 10/893,039 filed Jul. 16, 2004, U.S. patent application Ser. No. 10/983,353 filed Nov. 8, 2004, U.S. patent application Ser. No. 10/896,146 filed Jul. 21, 2004, now U.S. Pat. No. 7,215,882 U.S. patent application Ser. No. 11/072,597 filed Mar. 4, 2005, U.S. patent application Ser. No. 11/076,616 filed Mar. 10, 2005, U.S. patent application Ser. No. 11/191,886 filed Jul. 28, 2005, now U.S. Pat. No. 7,095,548 U.S. patent application Ser. No. 11/218,814 filed Sep. 2, 2005, and U.S. patent application Ser. No. 11/369,797 filed Mar. 6, 2006, all of which are hereby incorporated by reference.

FIELD OF INVENTION

The present invention relates to an optical zoom device and operational methods for the device.

BACKGROUND OF THE INVENTION

Conventional zoom devices require coupled mechanical motions to adjust the axial separations between individual or group elements in order to change the optical magnification as disclosed in U.S. Pat. No. 3,970,367 to Tsuji, U.S. Pat. No. 3,975,089 to Betensky, U.S. Pat. No. 4,097,124 to Watanabe, and U.S. Pat. No. 4,189,213 to Iizuka.

Figure 1:
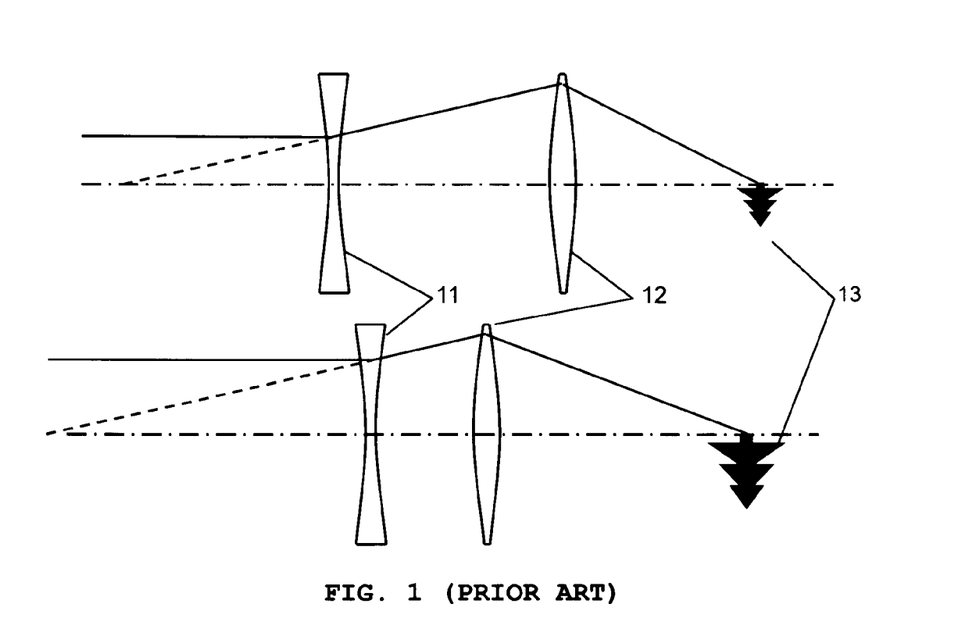
FIG. 1 is a schematic diagram showing a conventional mechanical zoom system.

FIG. 1 illustrates a conventional mechanical zoom system. At the very basic level, a zoom system includes at least one moving lens for zooming. One lens or group of lenses to change the image size is called the variator 11 and another lens or group or lenses to maintain focus throughout the zoom range is called the compensator 12. The variator 11 is moved to change the image size of an object. However, the image is defocused because the imaging position is also changed while the variator changes the image size of the object. Therefore, the variator 12 must move in unison with the compensator lens 12 to zoom and keep the image 13 in-focus. These movements are usually mechanically controlled by a zoom ring on the lens barrel.

The mechanical motions decrease the speed of zooming, increase space and weight as well as the power consumption and possibly induce of unwanted jitter. In addition, the mechanical zoom system is restricted to magnifying the area on-axis.

U.S. Pat. No. 4,407,567 to Michelet discloses a zoom device comprising piezoelectric multilayer structures. This system requires a high voltage, a large structure, a high manufacturing and maintenance cost, which make it difficult to implement in the small portable devices such as camera phone, PDA, portable computer, etc.

U.S. Pat. No. 4,190,330 to Berreman discloses a variable focus system comprising a nematic liquid crystal material. Its focal length is changed by modulating the refractive index. It has a slow response time typically on the order of hundreds of milliseconds. Even though the fastest response liquid crystal lens has the response time of tens of milliseconds, it has small focal length variation and low focusing efficiency.

Therefore, there has been a need for a small and fast zoom device that can change magnification.

SUMMARY OF THE INVENTION

The present invention contrives to solve the disadvantages of conventional zoom systems described in the above section.

An objective of the invention is to provide a small and fast zoom system without macroscopic mechanical movements of lens or lenses.

Another object of the invention is to provide a zoom system that consumes minimal power.

Still another object of the invention is to provide a zoom system that can compensate for the aberration of the system.

Still another object of the invention is to provide a zoom system that can have a variable optical axis.

To achieve the above objectives, the zoom system comprises one or more MMALs, wherein the MMAL comprises a plurality of micromirrors, wherein the focal length of the MMAL is changed by controlling the translation and/or rotation of each micromirror of the MMAL, wherein each micromirror of the MMAL is actuated by the electrostatic force.

The MMAL comprises a plurality of micromirrors to reflect light. The following U.S. patents and applications describe the MMAL: U.S. Pat. No. 6,934,072 to Kim, U.S. Pat. No. 6,934,073 to Kim, U.S. Pat. No. 6,970,284 to Kim, U.S. Pat. No. 6,999,226 to Kim, U.S. Pat. No. 7,031,046 to Kim, U.S. patent application Ser. No. 10/857,714 filed May 28, 2004, U.S. patent application Ser. No. 10/893,039 filed Jul. 16, 2004, and U.S. patent application Ser. No. 10/983,353 filed Nov. 8, 2004, all of which are hereby incorporated by reference.

The MMAL comprising micromirrors provides a very fast response time, a large focal length variation, a high optical focusing efficiency, a simple focusing structure, low power consumption, and a low production cost thanks to the mass production advantage. Also, the MMAL is an adaptive optical component which compensates aberration of the system and changes the optical axis without macroscopic mechanical movements of lenses.

A zoom system changing the magnification of an imaging system without macroscopic mechanical movements of lenses comprises a first MMAL and a second MMAL. The focal length of each MMAL is changed to form an image in-focus at a given magnification. The translation and/or rotation of each micromirror in the MMALs are controlled to change the focal lengths of the MMALs. Each micromirror of the MMALs is actuated by electrostatic force and/or electromagnetic force.

Figure 3A:
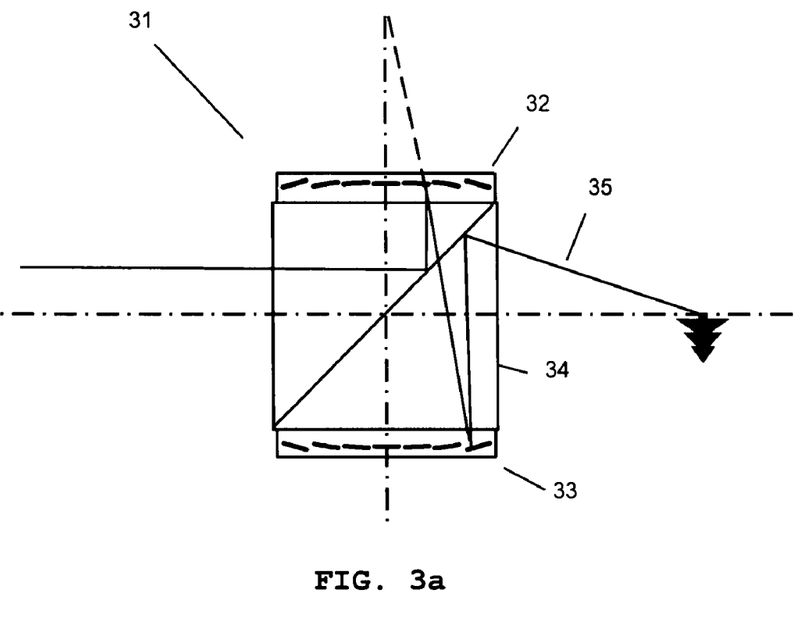
FIGS. 3a and 3b show zoom systems using one or more micromirror array lenses (MMALs)
Figure 3B:
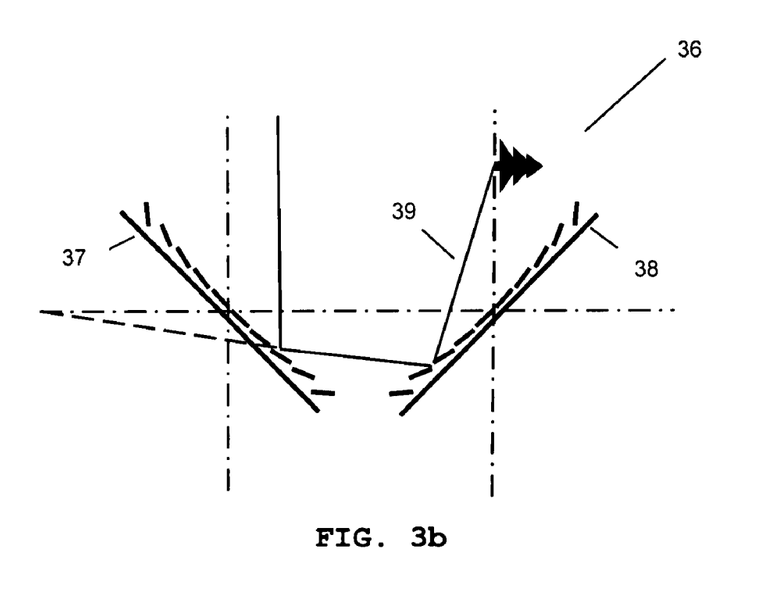

The zoom system includes a beam splitter positioned between the first MMAL and the second MMAL, as illustrated in FIG. 3a. Alternatively, the first MMAL and the second MMAL are positioned so that the path of the light reflected by the first MMAL and the second MMAL is not blocked as illustrated in FIG. 3b. The MMAL can be tilted in the zoom system so that the normal direction of the MMAL is different from the optical axis of the zoom system. When the MMAL is tilted about an axis, which is perpendicular to the optical axis, the surface profile of the MMAL is symmetric about an axis which is perpendicular to the normal direction of the MMAL and tilting axis.

The zoom system may further include a focus lens group to focus an image, an erector lens group to produce the bottom-side-up mirror image, and a relay lens group to focus the image onto the image sensor while the first MMAL forms a variator lens group, and the second MMAL forms a compensator lens group.

Furthermore, a conventional moving lens or a variable focal length lens can be used as a variator or a compensator while a MMAL is being used as the other.

Since the MMAL is an adaptive optical element, the zoom system can compensate for the aberration of the system by controlling each micromirror of the MMAL. The aberration of the system include, but not limited to, phase errors of light introduced by the medium between an object and its image and the defects of the zoom system that may cause the image to deviate from the rules of paraxial imagery. Further, an object which does not lie on the optical axis can be imaged by the MMAL without macroscopic mechanical movements of the zoom system.

The MMAL is further controlled to compensate for chromatic aberration by satisfying the same phase condition for each wavelength of Red, Green, and Blue (RGB) or Yellow, Cyan, and Magenta (YCM), respectively, to get a color image. The zoom system may further include a plurality of bandpass filters for color imaging. Also, the zoom system may further include a photoelectric sensor. The photoelectric sensor includes Red, Green, and Blue (RGB) or Yellow, Cyan, and Magenta (YCM) sensors. A color image is obtained by treatment of electrical signals from the corresponding colored sensors. The treatment of electrical signals from corresponding colored sensors is synchronized and/or matched with the control of the MMAL to satisfy the same phase condition for each wavelength respectively. Instead of satisfying three different wavelength phase matching condition, the MMAL can be controlled to satisfy phase matching condition at an optimal wavelength to minimize chromatic aberration. Even though the image quality of color is not perfect, this optimal wavelength phase matching can also be used for getting a color image.

The zoom system may further include optical filters for image enhancement.

The present invention is summarized again to facilitate understanding the structure of the claims.

The present invention provides a zoom system that includes one or more micromirror array lenses (MMALs). The MMAL includes a plurality of micromirrors. The focal length of the MMAL is changed by controlling the translation and/or rotation of each micromirror of the MMAL.

In one aspect of the invention, the zoom system includes a first MMAL having a plurality of micromirrors; and a second MMAL having a plurality of micromirrors, and optically coupled to the first MMAL. The first MMAL is closer to the object side of the zoom system, and the second MMAL is closer to the image side of the zoom system.

The first MMAL is a variator to control magnification of the zoom system by controlling the micromirrors and the second MMAL is a compensator to maintain focus throughout the zoom range by controlling the micromirrors.

Alternatively, the first MMAL is a compensator to maintain focus throughout the zoom range by controlling the micromirrors and the second MMAL is a variator to control magnification of the zoom system by controlling the micromirrors.

Alternatively, the first MMAL and the second MMAL both control magnification and maintain focus of the zoom system by controlling the micromirrors.

The first MMAL and the second MMAL are positioned so that the path of the light reflected by the first MMAL and the second MMAL is not blocked.

Alternatively, the zoom system includes a beam splitter positioned between the first MMAL and the second MMAL.

The zoom system may further include an auxiliary lens or group of lenses. The auxiliary lens or group of lenses include a focus lens, an erector lens and/or a relay lens.

In another aspect of the invention, the zoom system includes a fixed-focus lens or a group of fixed-focus lenses having mechanical motion; and a MMAL including a plurality of micromirrors.

The fixed-focus lens or group of fixed-focus lenses having mechanical motion is a variator to control magnification of the zoom system and the MMAL is a compensator to maintain focus throughout the zoom range by controlling the micromirrors.

Alternatively, the MMAL is a variator to control magnification of the zoom system by controlling the micromirrors and the fixed-focus lens or a group of fixed-focus lenses having mechanical motion is a compensator to maintain focus throughout the zoom range.

Alternatively, the fixed-focus lens or group of fixed-focus lenses having mechanical motion and the MMAL both control magnification and maintain focus of the zoom system by controlling the position of the conventional lens or a group of lenses and/or controlling micromirrors.

The zoom system may further include an auxiliary lens or group of lenses. The auxiliary lens or group of lenses include a focus lens, an erector lens and/or a relay lens.

In still another aspect of the invention, the zoom system includes a non-MMAL variable focus lens, wherein the focal length of the non-MMAL lens is changed; and a MMAL including a plurality of micromirrors. The MMAL is optically coupled to the non-MMAL variable focus lens. A non-MMAL optical element includes all optical elements that are constructed without MMAL technology.

The he non-MMAL variable focus lens is a variator to control magnification of the zoom system and the MMAL is a compensator to maintain focus throughout the zoom range by controlling the micromirrors.

Alternatively, the non-MMAL variable focus lens is a compensator to maintain focus throughout the zoom range and the MMAL is a variator to control magnification of the zoom system by controlling the micromirrors.

Alternatively, the non-MMAL variable focus lens and the MMAL both control magnification and maintain focus of the zoom system by controlling the focal length of the variable focus lens and controlling micromirrors.

The zoom system may further include an auxiliary lens or group of lenses. The auxiliary lens or group of lenses include a focus lens, an erector lens and/or a relay lens.

In still another aspect of the invention, the zoom system includes one MMAL including a plurality of micromirrors. The MMAL controls the magnification of the zoom system by controlling the micromirrors. The zoom system has a large depth of focus, whereby a pan focus zoom system is provided.

The zoom system may further include an auxiliary lens or group of lenses. The auxiliary lens or group of lenses comprise a focus lens, an erector lens and/or a relay lens.

Features common to all the aspects of the present invention are explained below:

The MMAL is tilted in the zoom system so that the normal direction of the MMAL is different from the optical axis of the zoom system. The profile of MMAL is symmetric about an axis which is perpendicular to the normal direction of the MMAL and the tilting axis.

The optical axis of MMAL is changed by controlling micromirrors.

The MMAL compensates for the aberration of the system by controlling micromirrors. The aberration is caused by phase errors of light introduced by the medium between an object and its image, or the aberration is caused by the zoom system.

The zoom system may further include an extra MMAL or MMALs to compensate for the aberration of the system including chromatic aberration.

The MMAL is further controlled to compensate for chromatic aberration by satisfying the same phase condition for each wavelength of Red, Green, and Blue (RGB) or Yellow, Cyan, and Magenta (YCM), respectively, to get a color image.

The MMAL is controlled to satisfy phase matching condition at an optimal wavelength to minimize chromatic aberration. The optimal wavelength phase matching is used for getting a color image.

The zoom system may further include an optical filter or filters for image enhancement.

The zoom system may further include an auxiliary lens or group of lenses. The auxiliary lens or group of lenses comprise a focus lens, an erector lens and/or a relay lens.

Each micromirror of the MMAL is actuated by electrostatic force.

The zoom system of the present invention has advantages: (1) a compact zoom system is provided; (2) the system has a very high zooming speed; (3) the system has a large variation of magnification; (4) the system has a variable optical axis; (5) the system has a high optical efficiency; (6) the cost is inexpensive because the MMAL is inexpensive and the macroscopic mechanical movements of lenses are not necessary; (7) the system compensates for the aberration of the system; (8) the system has a very simple structure because there is no macroscopic mechanical movements of lenses; (9) the system requires small power consumption when the MMAL is actuated by electrostatic force.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with reference to the accompanying drawings, wherein.

DETAILED DESCRIPTION OF THE INVENTION

Figure 2:
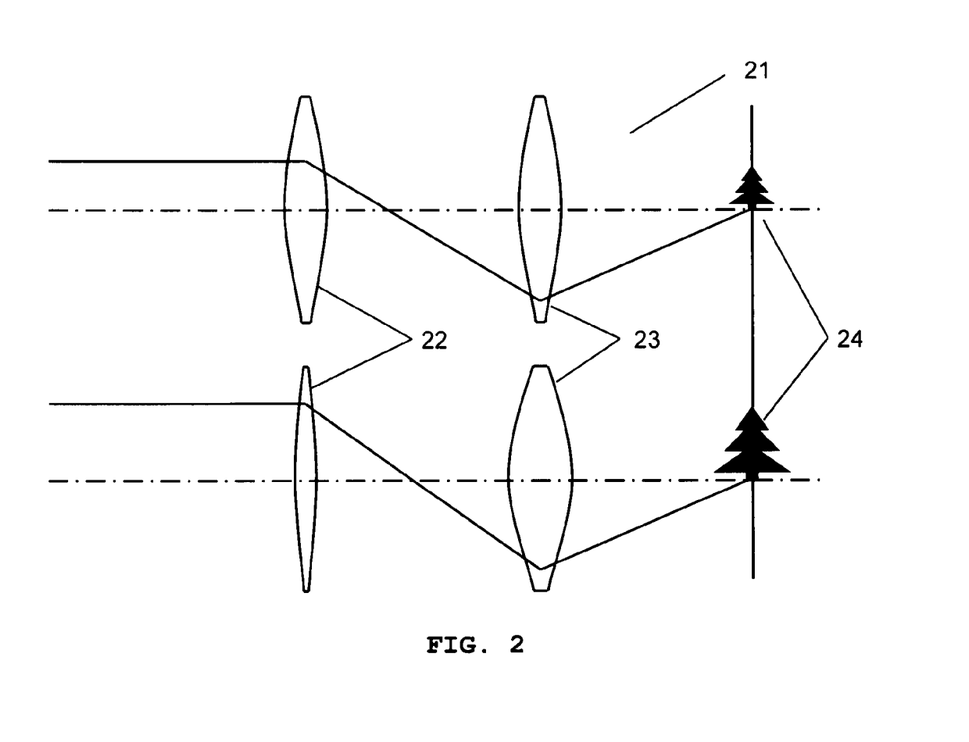
FIG. 2 shows a zoom system using one or more variable focal length lenses.

FIG. 2 shows a zoom system 21 using one or more variable focal length lenses. In the embodiment shown in FIG. 2, the zoom system includes a first variable focal length lens 22 and a second variable focal length lens 23. Changing the magnification of an imaging system is accomplished by utilizing the variable focal length lenses 22, 23. The first variable focal length lens 22 changes the image size. But, the image is defocused because the imaging position is also changed. Therefore, the focal length of the two variable focal length lenses 22, 23 must be changed in unison to magnify and keep the image 24 in-focus.

FIG. 3a shows a zoom system 31, in which MMALs 32 and 33 are used as variable focal length lenses 32 and 33. Since the MMALs 32 and 33 are reflective types, it is impossible to make an in-line optical arrangement without additional optical elements. Therefore, the zoom system 31 includes a beam splitter 34 positioned in the path of light 35 between the first MMAL 32 and the second MMAL 33. The beam splitter 34 changes the direction of the light 35 by 90 degrees, and thus simulates an in-line optical arrangement. As shown in FIG. 3a, the total size of the zoom system 31 is less than a conventional mechanical zoom system because necessary separation requirements between the variator and the compensator and between the compensator and an imaging sensor can be satisfied by a beam splitter 34 and the MMALs 32 and 33 in a small space.

FIG. 3b shows a zoom system 36, in which MMALs 37 and 38 are used as variable focal length lenses 32 and 33. Since it is impossible to make an in-line optical arrangement with MMALs 37 and 38, the first MMAL 37 and the second MMAL 38 are positioned so that the path of the light 39 reflected by the first MMAL 37 and the second MMAL 38 is not blocked by other components. This arrangement also can reduce the total size of the zoom system 36.

Since the positions of MMALs 32, 33, 37, and 38 need not be changed, the zoom systems 31, 36 do not need space for lens movements, thus the zoom system 31 and 36 can be manufactured with a compact size. Also the power consumption of the zoom systems 31 and 36 is minimal since there is no need to have macro movements of the MMALs 32, 33, 37, and 38.

The zoom systems 31 and 36 may include five groups of lenses to get necessary and auxiliary performances of a zoom system instead of two variable focal length lenses. They are a focus lens group, a variator lens group, a compensator lens group, an erector lens group, and a relay lens group. Even though the zoom system using MMALs is explained with two lenses, actual zoom system using MMALs also may have some groups of lenses.

Figure 4:
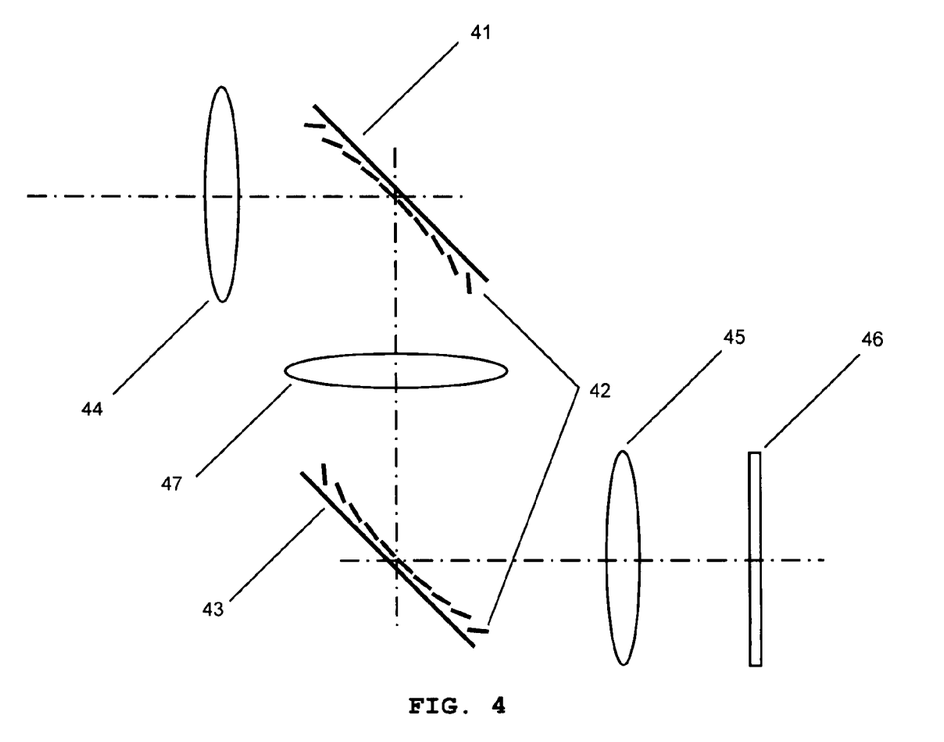
FIG. 4 illustrates a zoom system using two micromirror array lenses (MMALs)

FIG. 4 illustrates a zoom system according to one embodiment of the present invention using two or more micromirror array lenses (MMALs). The zoom system comprises a first MMAL 41 comprising a plurality of micromirrors 42 and a second MMAL 43 comprising a plurality of micromirrors 42, wherein the second MMAL 43 is optically coupled to the first MMAL 41. The zoom system may further comprise a first auxiliary lens group 44 and a second auxiliary lens group 45. In figures, lens groups are schematically illustrated by a lens for simplicity. It should be noted that in practice, each lens group may include a different kind and different number of lenses to satisfy system requirements. The first auxiliary lens group 44 is a focus lens group to bring the object into focus.

Figure 8A:
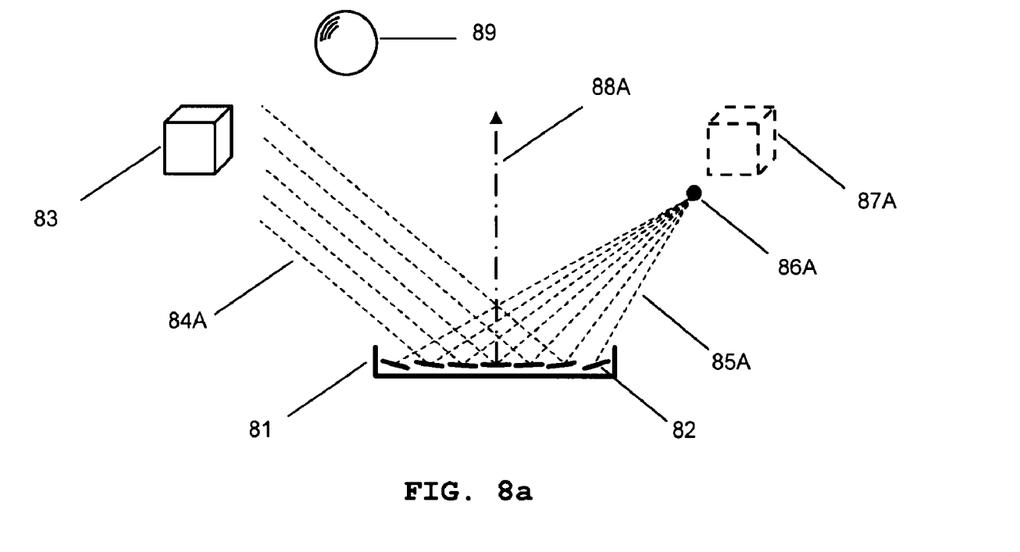
FIGS. 8a and 8b are schematic representations for optical axis changes in the MMAL.
Figure 8B:
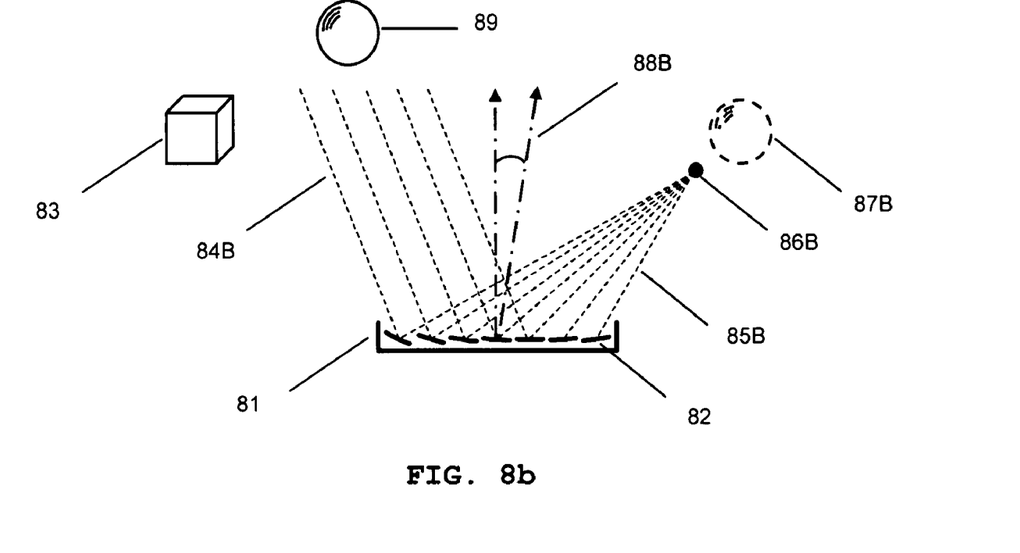

The first MMAL 41 is a variator to control magnification of the zoom system by controlling the rotation and/or translation of micromirrors 42. The second MMAL 43 is a compensator to maintain focus throughout the zoom range by controlling the rotation and/or translation of micromirrors 42. The second auxiliary lens group 45 is a relay lens group to focus the image onto an image sensor 46. The optical axis can be changed by controlling rotation and/or translation of micromirrors 42 of the MMALs 41 and 43, as will be explained in FIG. 8. Further, each micromirror 42 of the MMALs 41 and 43 can be controlled to compensate for the aberration of the system. In one alternative embodiment, the first MMAL 41 is used as a compensator to maintain focus throughout the zoom range while the second MMAL 43 is used as a variator to control magnification of the zoom system by controlling the micromirrors 42. In another alternative embodiment, the first MMAL 41 and the second MMAL 43 both control magnification and maintain focus of the zoom system altogether by controlling the micromirrors 42.

The zoom system may further comprise an additional auxiliary lens group 47 as an erector lens group in order to produce an inverted image. Also the auxiliary lens or group of lenses 47 can be used for further enhancement of the zoom system. The zoom system may further comprise extra MMAL or MMALs to compensate for the aberration of the system including chromatic aberration. The zoom system may further comprises an optical filter or filters for image enhancement. Since the zoom system of the present invention does not have macroscopic moving elements, the zoom system can be built in a simple and compact structure with advantages including low power consumption, low cost, and high zooming speed.

Figure 5:
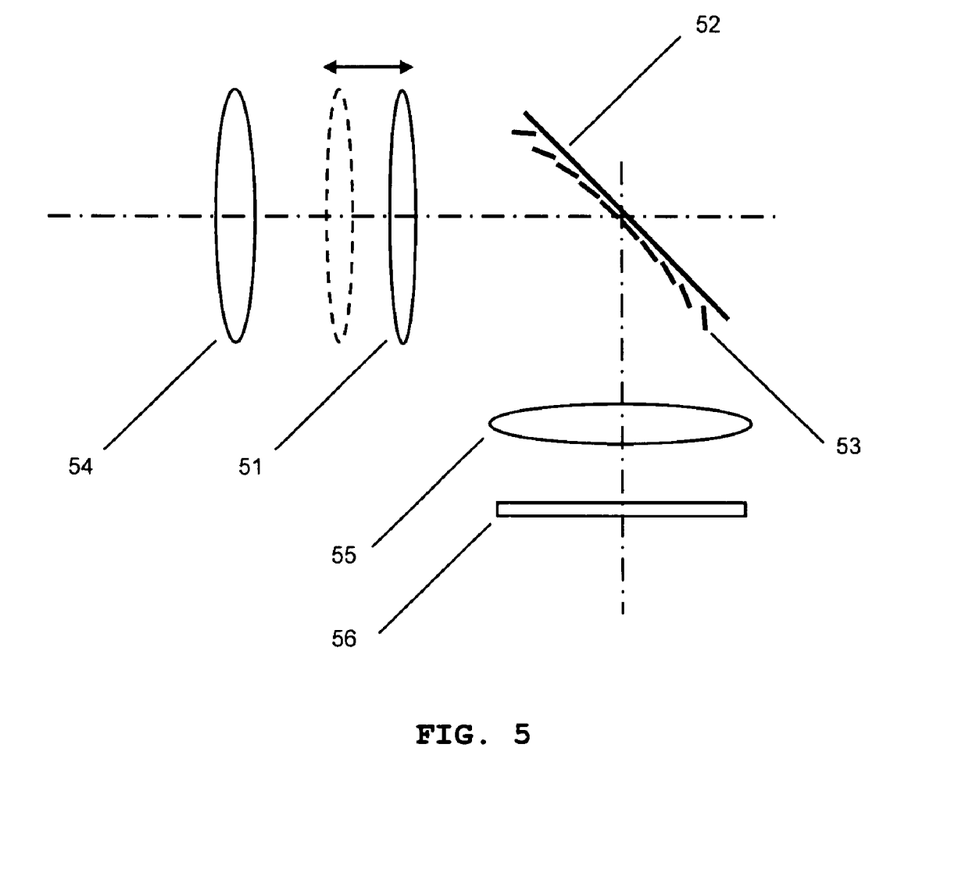
FIG. 5 illustrates a zoom system comprising a MMAL and a conventional lens or a group of conventional lenses having mechanical motion.

FIG. 5 illustrates a zoom system according to another embodiment of the present invention by replacing one of the MMALs in FIG. 4 with a conventional lens or a group of conventional lenses having mechanical motion. The zoom system comprises a conventional lens or a group of convention lenses 51 having mechanical motion and a MMAL 52 comprising a plurality of micromirrors 53, wherein the MMAL 52 is optically coupled to conventional lens or a group of conventional lenses 51. The zoom system may further comprise a first auxiliary lens group 54 and a second auxiliary lens group 55. The first auxiliary lens group 54 is a focus lens group to bring the object into focus. The conventional lens or group of conventional lenses 51 having mechanical motion is a variator to control magnification of the zoom system and the MMAL 52 is a compensator to maintain focus throughout the zoom range by controlling the rotation and/or translation of the micromirrors 53. The second auxiliary lens group 55 is a relay lens group to focus the image onto an image sensor 56. The optical axis can be changed by controlling rotation and/or translation of micromirrors 53 of the MMAL 52. Each micromirror 53 of the MMAL 52 can be controlled to compensate for the aberration of the system. The zoom system may further comprise a MMAL to compensate for the aberration of the system including chromatic aberration. In one alternative embodiment, the MMAL 52 is used as a variator to control magnification of the zoom system by controlling the micromirrors 53, while the conventional movable lens or group of conventional lenses 51 having mechanical motion is used as a compensator to maintain focus throughout the zoom range. In another alternative embodiment, the conventional lens or group of conventional lenses 51 having mechanical motion and the MMAL 52 both control magnification and maintain focus of the zoom system by controlling the position of the conventional lens or group of lenses 51 and/or by controlling the micromirrors 53. The zoom system of the present invention has less moving elements than those of conventional zoom systems.

Figure 6A:
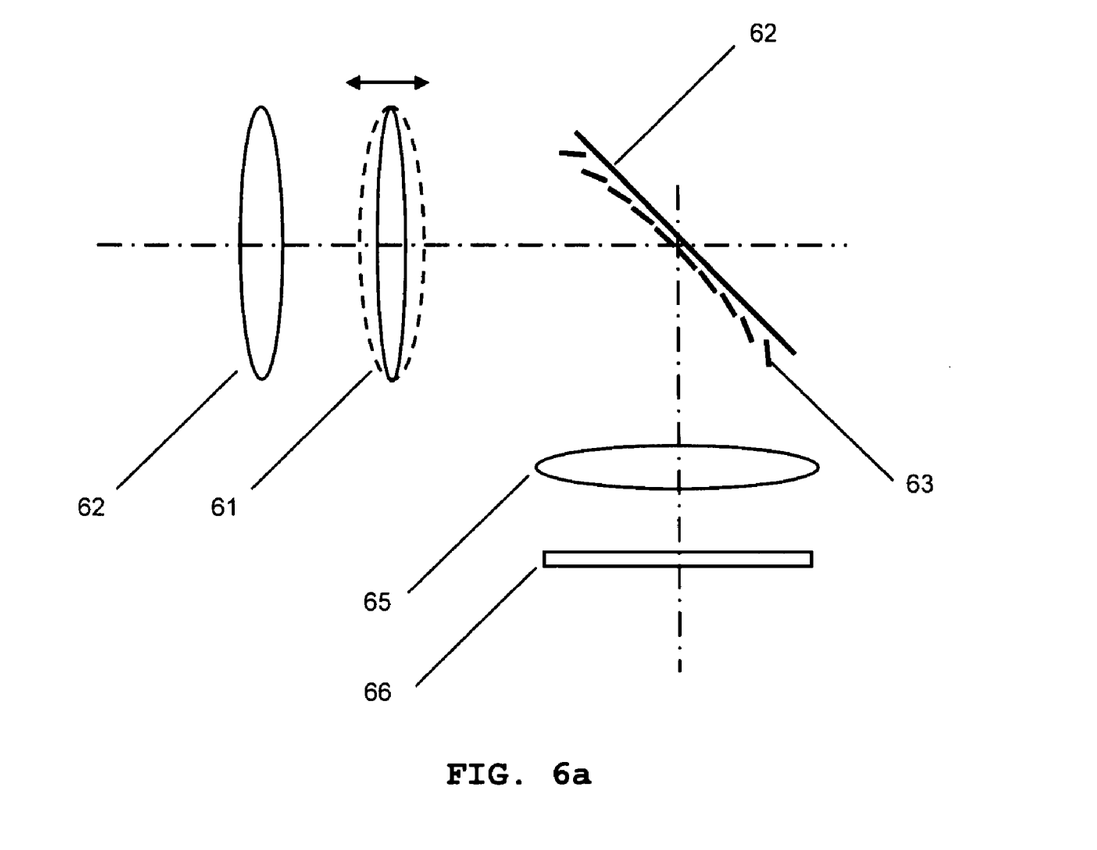
FIGS. 6a and 6b illustrate a zoom system comprising a MMAL and a conventional variable focus lens.
Figure 6B:
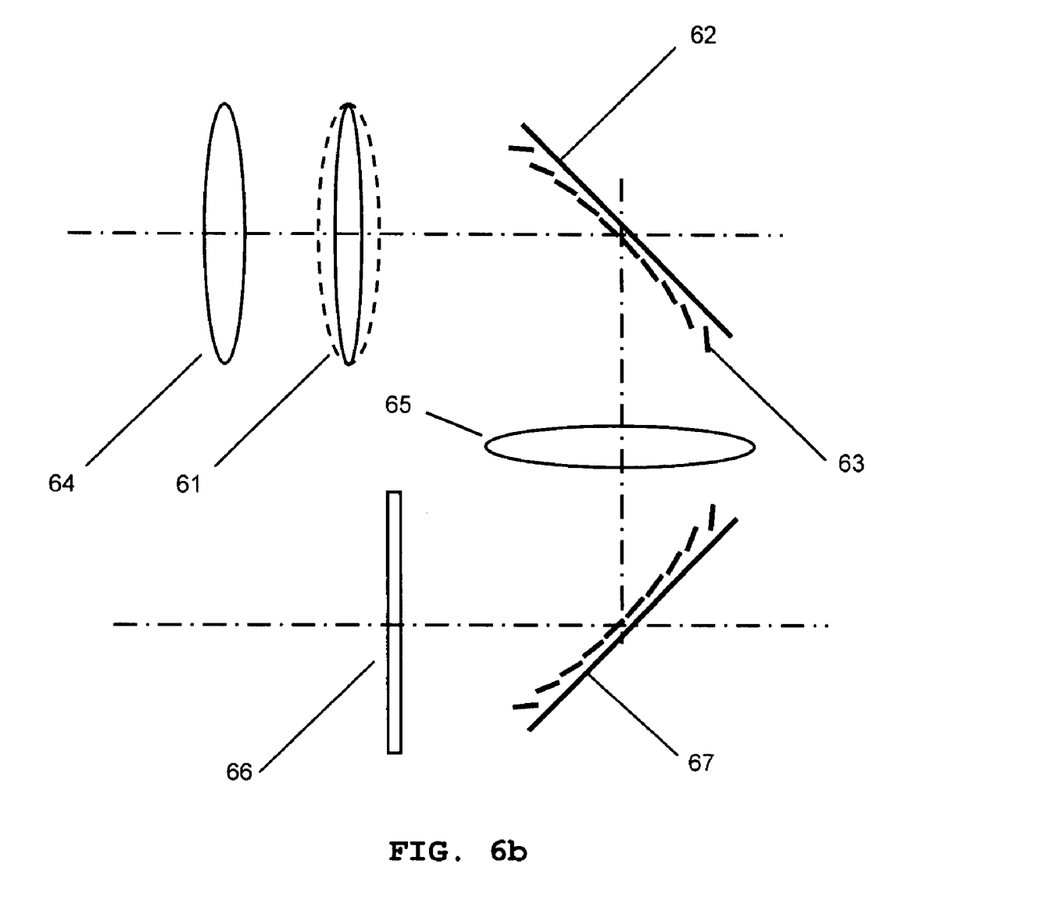

FIG. 6a illustrates a zoom system according to another embodiment of the present invention by replacing one of the MMALs in FIG. 4 with a conventional variable focus lens. The zoom system comprises a conventional variable focus lens 61, wherein the focal length of the lens is changed and a MMAL 62 comprising a plurality of micromirrors 63, wherein the MMAL 62 is optically coupled to the conventional variable focus lens 61. The zoom system may further comprise a first auxiliary lens group 64 and a second auxiliary lens group 65. The first auxiliary lens group 64 is a focus lens group to bring the object into focus. The variable focus lens 61, which is a conventional variable focal length lens such as liquid crystal lenses, is a variator to control magnification of the zoom system. The MMAL 62 is a compensator to maintain focus throughout the zoom range by controlling the rotation and/or translation of micromirrors 63. In one alternative embodiment, the MMAL 62 is used as a variator to control magnification of the zoom system by controlling the micromirrors 63, while the conventional variable focus lens 61 is used as a compensator to maintain focus throughout the zoom range. In another alternative embodiment, the conventional variable focus lens 61 and the MMAL 62 both control magnification and maintain focus of the zoom system by controlling the focal length of the variable focus lens 61 and/or by controlling micromirrors 63. The second auxiliary lens group 65 is a relay lens group to focus the image onto an image sensor 66. The optical axis can be changed by controlling rotation and/or translation of micromirrors 63 of the MMAL 62. Each micromirror 63 of the MMAL 62 can be controlled to compensate for the aberration of the system. As shown in FIG. 6b, the zoom system may further comprise extra MMAL 67 to compensate for the aberration of the system including chromatic aberration. Since the zoom system of the present invention does not have macroscopic moving elements, the zoom system can be built in a simple and compact structure with advantages including low power consumption, low cost, and high zooming speed.

Figure 7:
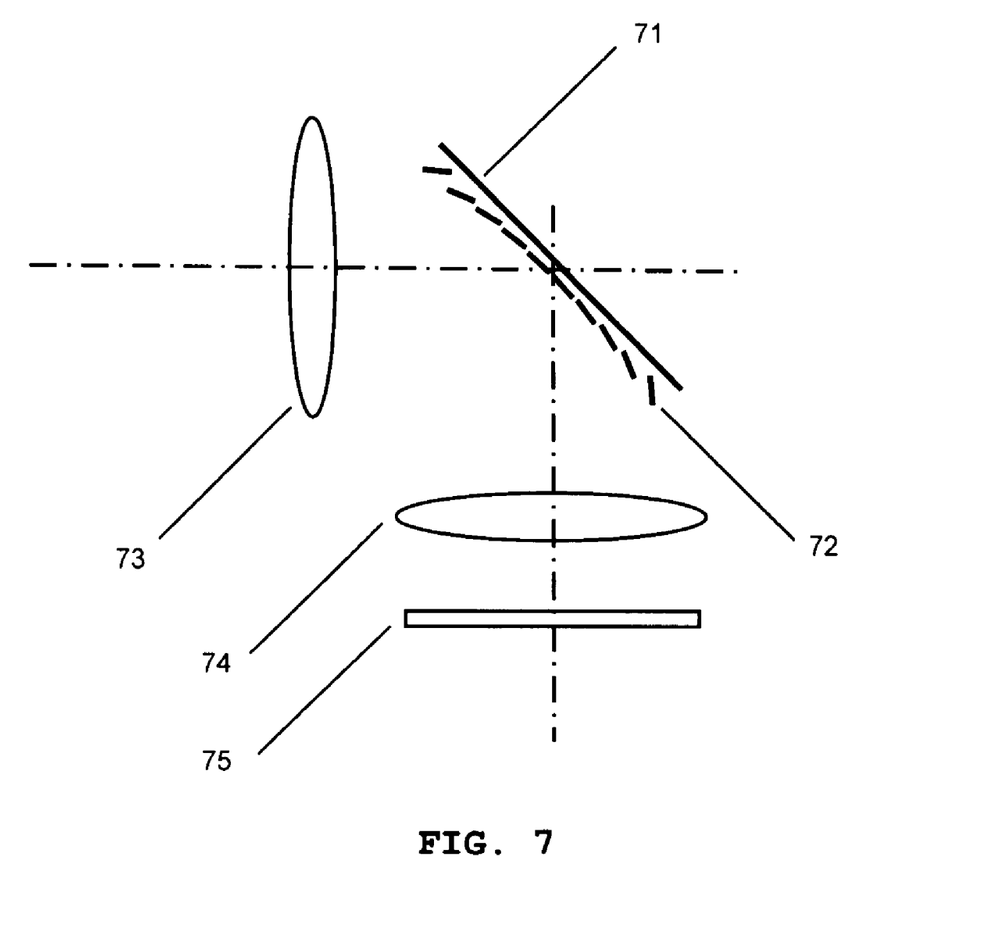
FIG. 7 illustrates a zoom system with a MMAL for pan focus zooming system.

FIG. 7 illustrates a zoom system with a pan focus having one MMAL 71 comprising a plurality of micromirrors 72 wherein the MMAL 71 controls the magnification of the zoom system by controlling the micromirrors 72. The zoom system may further comprise a first auxiliary lens 73 and a second auxiliary lens 74. The first auxiliary lens group 73 is a focus lens group to bring the object into focus. The MMAL 71 is a variator to control magnification of the zoom system by controlling the rotation and/or translation of micromirrors 72. By using large depth of focus in the zoom system, the system removes the variable compensator part and performs zoom function with pan focus. The second auxiliary lens group 74 is a relay lens group to focus the image onto an image sensor 75. The optical axis can be changed by controlling rotation and/or translation of micromirrors 72 of the MMAL 71. Each micromirror 72 of the MMAL 71 can be controlled to compensate for the aberration of the system. This embodiment can be applied to a zoom system having a long depth of focus without introducing compensator group lens or lenses. Smaller aperture and longer focal length, longer depth of focus. This embodiment is advantageous to a low cost, small zoom system having a long depth of focus such as cellular phone, PDA, and potable computer since it does not require a compensator.

FIGS. 8a and 8b show how the optical axis of the MMAL changes. The optical axis of the MMAL 81 is changed by controlling the micromirrors 82. A bunch of light is focused by the MMAL 81. In FIG. 8a, a cube object 83 is imaged onto the image plane. The light 84A from the object 83 is reflected by each of the micromirror 82. The reflected light 85A is focused onto the focal point 86A of the image and finally makes an image of a cube 87A in the image sensor. During the focusing process the optical axis is defined as a surface normal direction 88A of a micromirror 82.

As shown in FIG. 8b, the MMAL can make a different image 87B from a different object 89 without macroscopic movements. By changing the respective angles of the micromirrors 82, this time the MMAL accepts the light 84B from the sphere 89. The reflected light 85B is focused onto a focal point 86B and makes the image of the sphere 87B. This time the optical axis is changed by an angle and becomes the surface normal direction 88B of a micromirror.

Figures 9A, 9B:
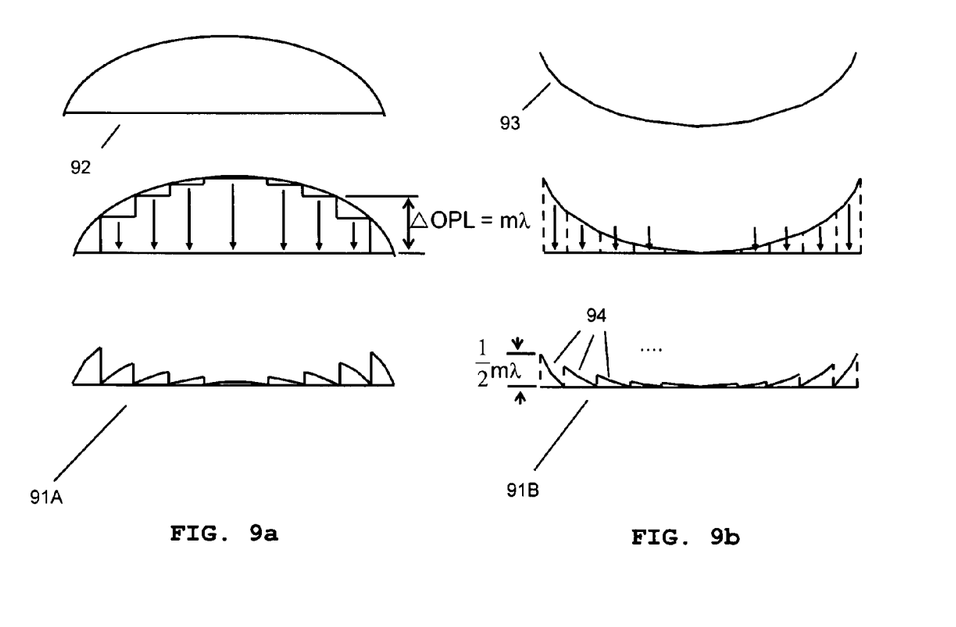
FIG. 9a is a schematic diagram showing how a refractive Fresnel lens replaces an ordinary single-bodied lens.
FIG. 9b is a schematic diagram showing how a reflective Fresnel lens replaces an ordinary single-bodied mirror.

FIG. 9a schematically shows how a refractive Fresnel lens 91A replaces an ordinary single-bodied lens 92. FIG. 9b shows how a reflective Fresnel lens 91B replaces an ordinary single-bodied mirror 93. The reflective Fresnel lens can be formed using a MMAL. The MMAL includes a plurality of micromirrors which represents the discrete parts of the reflective Fresnel lens 94, and each micromirror is controlled to form a reflective Fresnel lens and to change the focal length of the lens.

In order to obtain a bright and sharp image, the variable focal length MMAL must meet the two conditions for forming a lens. One is that all the rays should be converged into the focus, and the other is that the phase of the converged rays must be the same. Even though the rays have different optical path lengths, the same phase condition can be satisfied by adjusting the optical path length difference to be integer multiples of the wavelength of the light. Each facet converges rays to one point, and rays refracted or reflected by different facets have an optical path length difference of integer multiples of the incident light.

To change the focal length of the MMAL, the translational motion and/or the rotational motion of each of the micromirrors are controlled to change the direction of light and to satisfy the phase condition of the light.

The variable focal length MMAL is also an adaptive optical component compensating for the aberration of the zoom system by controlling the translational motion and/or the rotational motion of each micromirror.

Figure 10:
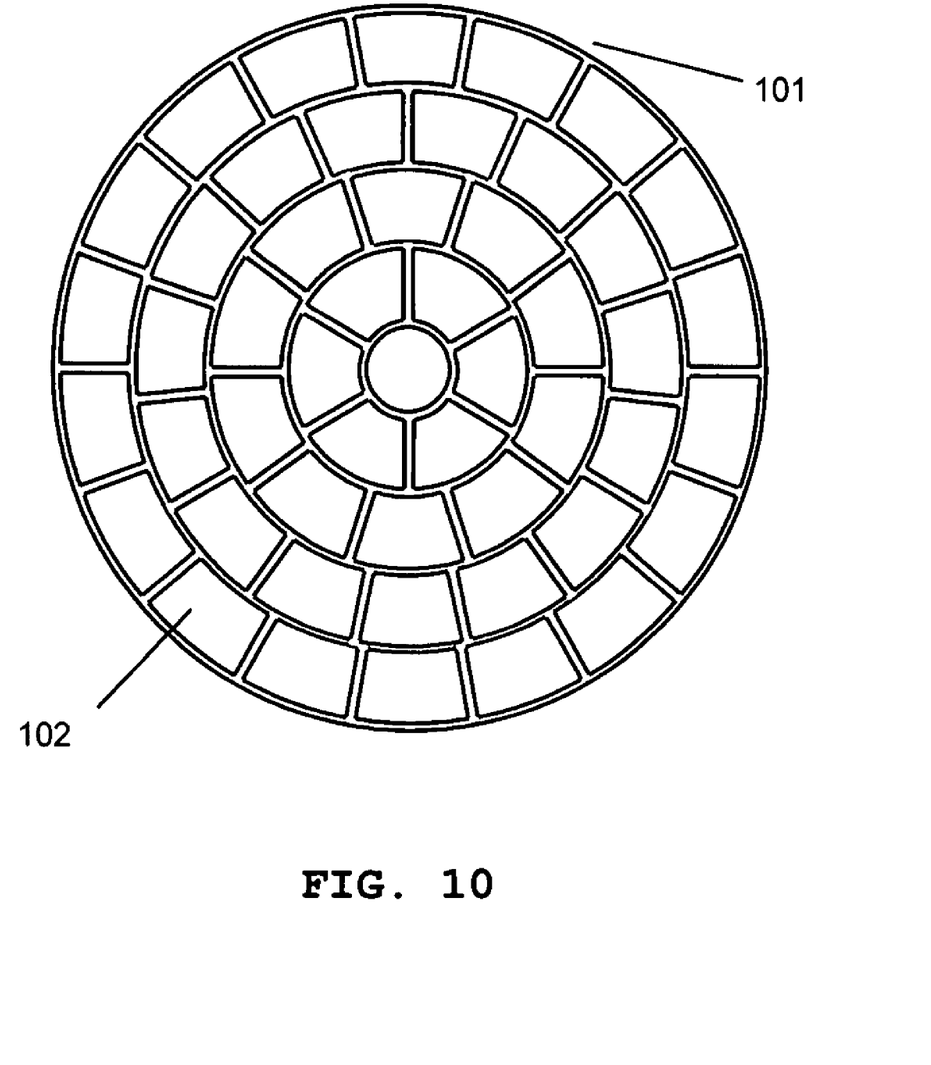
FIG. 10 is a schematic plan view showing a MMAL that is made of many micromirrors.

FIG. 10 shows a MMAL 101 comprising a plurality of micromirrors 102 arranged to form many concentric circles. The micromirrors 102 are arranged in a flat plane as shown in FIG. 9b.

The MMAL used in the present invention has advantages: (1) the MMAL has a very fast response time because each micromirror has a tiny mass; (2) the MMAL has a large focal length variation because large numerical aperture variations can be achieved by increasing the maximum rotational angle of the micromirror; (3) the MMAL has a high optical focusing efficiency; (4) the MMAL can have a large size aperture without losing optical performance. Because the MMAL includes discrete micromirrors, the increase of the lens size does not enlarge the aberration caused by shape error of a lens; (5) the cost is inexpensive because of the advantage of mass productivity of microelectronics manufacturing technology; (6) the MMAL can compensate for the aberration of the system; (7) the MMAL makes the focusing system simple; (8) the MMAL requires small power consumption when electrostatic actuation is used to control it.

What is claimed is:

1. A zoom system comprising one or more micromirror array lenses (MMALs), wherein the MMAL comprises a plurality of micromirrors, wherein the focal length of the MMAL is changed by controlling the translation and/or rotation of each micromirror of the MMAL, and wherein the MMAL compensates for the aberration of the system.

2. The zoom system of claim 1, wherein the zoom system comprises:
   a) a first MMAL comprising a plurality of micromirrors; and
   b) a second MMAL comprising a plurality of micromirrors, wherein the second MMAL is optically coupled to the first MMAL;
   wherein the first MMAL is closer to the object side of the zoom system, wherein the second MMAL is closer to the image side of the zoom system.

3. The zoom system of claim 2, wherein the first MMAL is a variator to control magnification of the zoom system by controlling the micromirrors and the second MMAL is a compensator to maintain focus throughout the zoom range by controlling the micromirrors.

4. The zoom system of claim 2, wherein the first MMAL is a compensator to maintain focus throughout the zoom range by controlling the micromirrors and the second MMAL is a variator to control magnification of the zoom system by controlling the micromirrors.

5. The zoom system of claim 2, wherein the first MMAL and the second MMAL both control magnification and maintain focus of the zoom system by controlling the micromirrors.

6. The zoom system of claim 2, wherein the first MMAL and the second MMAL are positioned so that the path of the light reflected by the first MMAL and the second MMAL is not blocked.

7. The zoom system of claim 2, further comprising a beam splitter positioned between the first MMAL and the second MMAL.

8. The zoom system of claim 2, further comprising an auxiliary lens or group of lenses, wherein the auxiliary lens or group of lenses comprise a focus lens, an erector lens and/or a relay lens.

9. The zoom system of claim 1, wherein the zoom system comprises
   a) a fixed-focus lens or a group of fixed-focus lenses having mechanical motion; and
   b) a MMAL comprising a plurality of micromirrors.

10. The zoom system of claim 9, wherein the fixed-focus lens or group of fixed-focus lenses having mechanical motion is a variator to control magnification of the zoom system and the MMAL is a compensator to maintain focus throughout the zoom range by controlling the micromirrors.

11. The zoom system of claim 9, wherein the MMAL is a variator to control magnification of the zoom system by controlling the micromirrors and the fixed-focus lens or a group of fixed-focus lenses having mechanical motion is a compensator to maintain focus throughout the zoom range.

12. The zoom system of claim 9, wherein the fixed-focus lens or group of fixed-focus lenses having mechanical motion and the MMAL both control magnification and maintain focus of the zoom system by controlling the position of the conventional lens or a group of lenses and/or controlling micromirrors.

13. The zoom system of claim 9, further comprising an auxiliary lens or group of lenses, wherein the auxiliary lens or group of lenses comprise a focus lens, an erector lens and/or a relay lens.

14. The zoom system of claim 1, wherein the zoom system comprises
   a) a non-MMAL variable focus lens, wherein the focal length of the non-MMAL lens is changed; and
   b) a MMAL comprising a plurality of micromirrors, wherein the MMAL is optically coupled to the non-MMAL variable focus lens.

15. The zoom system of claim 14, wherein the non-MMAL variable focus lens is a variator to control magnification of the zoom system and the MMAL is a compensator to maintain focus throughout the zoom range by controlling the micromirrors.

16. The zoom system of claim 14, wherein the non-MMAL variable focus lens is a compensator to maintain focus throughout the zoom range and the MMAL is a variator to control magnification of the zoom system by controlling the micromirrors.

17. The zoom system of claim 14, wherein the non-MMAL variable focus lens and the MMAL both control magnification and maintain focus of the zoom system by controlling the focal length of the variable focus lens and controlling micromirrors.

18. The zoom system of claim 14, further comprising an auxiliary lens or group of lenses, wherein the auxiliary lens or group of lenses comprise a focus lens, an erector lens and/or a relay lens.

19. The zoom system of claim 1, wherein the zoom system comprises one MMAL comprising a plurality of micromirrors, wherein the MMAL controls the magnification of the zoom system by controlling the micromirrors, wherein the zoom system has a large depth of focus, whereby a pan focus zoom system is provided.

20. The zoom system of claim 19, further comprising an auxiliary lens or group of lenses, wherein the auxiliary lens or group of lenses comprise a focus lens, an erector lens and/or a relay lens.

21. The zoom system of claim 1, wherein the MMAL is tilted in the zoom system so that the normal direction of the MMAL is different from the optical axis of the zoom system.

22. The zoom system of claim 21, wherein the profile of MMAL is symmetric about an axis which is perpendicular to the normal direction of the MMAL and the tilting axis.

23. The zoom system of claim 1, wherein the optical axis of MMAL is changed by controlling micromirrors.

24. The zoom system of claim 1, wherein the aberration is caused by phase errors of light introduced by the medium between an object and its image.

25. The zoom system of claim 1, wherein the aberration is caused by the zoom system.

26. The zoom system of claim 1, further comprising extra MMAL or MMALs to compensate for the aberration of the system including chromatic aberration.

27. The zoom system of claim 1, wherein the MMAL is further controlled to compensate for chromatic aberration by satisfying the same phase condition for each wavelength of Red, Green, and Blue (RGB) or Yellow, Cyan, and Magenta (YCM), respectively, to get a color image.

28. The zoom system of claim 1, wherein the MMAL is controlled to satisfy phase matching condition at an optimal wavelength to minimize chromatic aberration, wherein the optimal wavelength phase matching is used for getting a color image.

29. The zoom system of claim 1, further comprising an optical filter or filters for image enhancement.

30. The zoom system of claim 1, further comprising auxiliary lens or group of lenses, wherein the auxiliary lens or group of lenses comprise a focus lens, an erector lens and/or a relay lens.

31. The zoom system of claim 1, wherein each micromirror of the MMAL is actuated by electrostatic force.

* * * * *